(12) United States Patent
Altinsel

(10) Patent No.: US 11,448,545 B1
(45) Date of Patent: Sep. 20, 2022

(54) SCALE APPARATUS AND METHODS OF USE THEREOF

(71) Applicant: Penguin Magic, Inc., Rancho Cordova, CA (US)

(72) Inventor: Acar Altinsel, Rancho Cordova, CA (US)

(73) Assignee: PENGUIN MAGIC, INC., Rancho Cordova, CA (US)

( * ) Notice: Subject to any disclaimer, the term of this patent is extended or adjusted under 35 U.S.C. 154(b) by 0 days.

(21) Appl. No.: 17/669,552

(22) Filed: Feb. 11, 2022

(51) Int. Cl.
| | | |
|---|---|---|
| *G01G 17/02* | (2006.01) | |
| *G01G 21/28* | (2006.01) | |
| *A63F 1/06* | (2006.01) | |
| *G01G 23/36* | (2006.01) | |
| *G01G 21/22* | (2006.01) | |

(52) U.S. Cl.
CPC .............. *G01G 17/02* (2013.01); *A63F 1/06* (2013.01); *G01G 21/22* (2013.01); *G01G 21/28* (2013.01); *G01G 23/36* (2013.01)

(58) Field of Classification Search
CPC ...... G01G 17/02; G01G 19/414; G01G 19/42; G01G 19/52; G01G 21/28; G01G 23/36; A63F 1/06
See application file for complete search history.

(56) References Cited

U.S. PATENT DOCUMENTS

| | | | | | |
|---|---|---|---|---|---|
| 4,108,363 | A | * | 8/1978 | Susumu | G07F 9/105 177/25.14 |
| 4,447,885 | A | * | 5/1984 | Biss | G06M 9/00 177/25.17 |
| 4,891,755 | A | * | 1/1990 | Asher | G01G 19/52 705/28 |
| 5,193,629 | A | * | 3/1993 | Lare | G07D 9/04 177/25.17 |
| 5,608,193 | A | * | 3/1997 | Almogaibil | G01G 19/42 177/25.17 |
| 2003/0178233 | A1 | * | 9/2003 | Montagnino | G01G 23/3728 177/142 |
| 2013/0220708 | A1 | * | 8/2013 | Kim | G01G 23/3735 177/3 |

* cited by examiner

*Primary Examiner* — Randy W Gibson
(74) *Attorney, Agent, or Firm* — Polsinelli PC

(57) ABSTRACT

A scale apparatus is described. The scale apparatus may include a housing sized to fit within a playing card tuck box; a pressure plate operable to measure a weight of a plurality of objects; a wireless transmitter; and a microcontroller in communication with the pressure plate and the wireless transmitter. The microcontroller may be configured to: continuously measure the weight on the pressure plate; when the weight holds steady for a sequence of measurements, transmit a first weight measurement via the wireless transmitter; measure a change in the weight; and when the change in the weight is steady, transmit a second weight measurement via the wireless transmitter.

29 Claims, 6 Drawing Sheets

SCALE APPARATUS AND METHODS OF USE THEREOF

FIELD

The present disclosure relates generally to a scale apparatus. In at least one example, the present disclosure relates to a scale operable to accurately weigh a plurality of objects and wirelessly transmit measurements.

BACKGROUND

Magicians often perform magic tricks in close proximity to observers such as identifying a particular item that the observer has selected. The magician may then wish to know what the selected item is with a high level of predictability and accuracy. However, it can be difficult to incorporate technology to assist a magician in this identification while sufficiently concealing it from the observer. This often complicates the types of apparatuses that may be used to assist magicians.

As presented herein, a scale apparatus has been developed to overcome these problems.

BRIEF SUMMARY

Provided herein is a scale apparatus comprising: a housing sized to fit within a playing card tuck box; a pressure plate operable to measure a weight of a plurality of objects; a wireless transmitter; and a microcontroller in communication with the pressure plate and the wireless transmitter. The microcontroller is configured to: continuously measure the weight on the pressure plate; when the weight holds steady for a sequence of measurements, transmit a first weight measurement via the wireless transmitter; measure a change in the weight; and when the change in the weight is steady, transmit a second weight measurement via the wireless transmitter.

In an aspect, the scale apparatus is operable to tare prior to the first weight measurement, prior to the second weight measurement, or a combination thereof. The plurality of objects may be a deck of cards, coins, keys, or other handheld objects. The wireless transmitter may be a protected Bluetooth® transmitter. In some aspects, the scale apparatus further comprises a screen or display. In some aspects, the housing comprises at least two legs to four legs extending from a bottom panel of the housing. The legs may have a height of 1 mm to 1.5 mm. In an aspect, the pressure plate is located inside the housing and adjacent a bottom panel of the housing. In another aspect, the pressure plate is located inside the housing and below the wireless transmitter and microcontroller.

Another aspect of the present disclosure is a scale system comprising the scale apparatus and a control system, the control system comprising a processor configured to: receive the first weight measurement; and receive the second weight measurement. The control system may be further configured to: receive an input of an initial total number of objects; calculate a weight per object based on the first weight measurement; and estimate the number of objects removed from the scale apparatus based on the second weight measurement and the calculated weight per object. The control system may be further configured to: compare the number of objects removed with a library comprising the identity and order of the plurality of objects; and estimate the identity of at least one of the removed objects. The control system may be further configured to: display a representation of the identity of the at least one removed object, the number of objects removed, or other information based on the number of objects removed. In some aspects, the control system is located on a mobile device. In other aspects, the control system is located in the housing of the scale apparatus.

The scale system may further comprise a modified playing card tuck box comprising: a top surface configured to be on top of the pressure plate; four side surfaces; and an opening opposite the top surface, wherein the housing comprises legs that extend through the opening. The top surface comprises a removeable adhesive to connect the modified playing card tuck box to the housing of the scale apparatus. One of the four side surfaces is a flap and comprises a magnet operable to attach to a corresponding side panel of the housing of the scale apparatus. The corresponding side panel of the housing comprises a magnet and a USB charging input. A bottom panel of the housing comprises an image of the bottom of a playing card tuck box and is viewable via the opening in the modified playing card tuck box when the legs of the housing are not resting on a flat surface. The legs of the housing and a bottom panel of the housing are not viewable to an observer when the legs of the housing are resting on a flat surface.

A further aspect of the disclosure includes a scale apparatus comprising: a housing sized to fit within a box; a pressure plate operable to measure a weight of a plurality of objects; a wireless transmitter; and a microcontroller in communication with the pressure plate and the wireless transmitter. The microcontroller is configured to: continuously measure the weight on the pressure plate; when the weight holds steady for a sequence of measurements, transmit a first weight measurement via the wireless transmitter; measure a change in the weight; and when the change in the weight is steady, transmit a second weight measurement via the wireless transmitter. The box may be a playing card tuck box, a cigar box, a cigarette box, a cigarette carton, or a shoe box. The box has dimensions less than about 14 in×14 in×6 in, less than about 10 in×10 in×3 in, less than about 8 in×8 in×2 in, or less than about 6 in×6 in×1 in.

Another aspect of the disclosure includes a method of measuring a weight of a plurality of objects using a scale apparatus or system. The method comprises: continuously measuring a weight of the plurality of objects on the scale apparatus using a pressure plate and microcontroller in the scale apparatus; transmitting a first weight measurement via a wireless transmitter in the scale apparatus when the weight holds steady for a sequence of measurements; measuring a change in the weight using the pressure plate; and transmitting a second weight measurement via the wireless transmitter in the scale apparatus when the change in the weight is steady for a sequence of measurements, where the pressure plate is located inside a housing of the scale apparatus and adjacent a bottom panel of the housing.

The method may further comprise: receiving, via a control system, the first weight measurement; and receiving, via the control system, the second weight measurement. The method may further comprise: receiving, via the control system, an input of an initial total number of objects; calculating, via the control system, a weight per object based on the first weight measurement; and estimating, via the control system, the number of objects removed from the scale apparatus based on the second weight measurement and the calculated weight per object. The method may further comprise: comparing, via the control system, the number of objects removed with a library comprising the identity and order of the plurality of objects; and estimating, via the control system, the identity of at least one of the removed objects. The method may further comprise: displaying a representation of the identity of the at least one removed object, the number of objects removed, or other information based on the number of objects removed.

Other aspects and iterations of the invention are described more thoroughly below.

BRIEF DESCRIPTION OF THE DRAWINGS

Implementations of the present technology will now be described, by way of example only, with reference to the attached figures, wherein.

DETAILED DESCRIPTION

Figure 1:
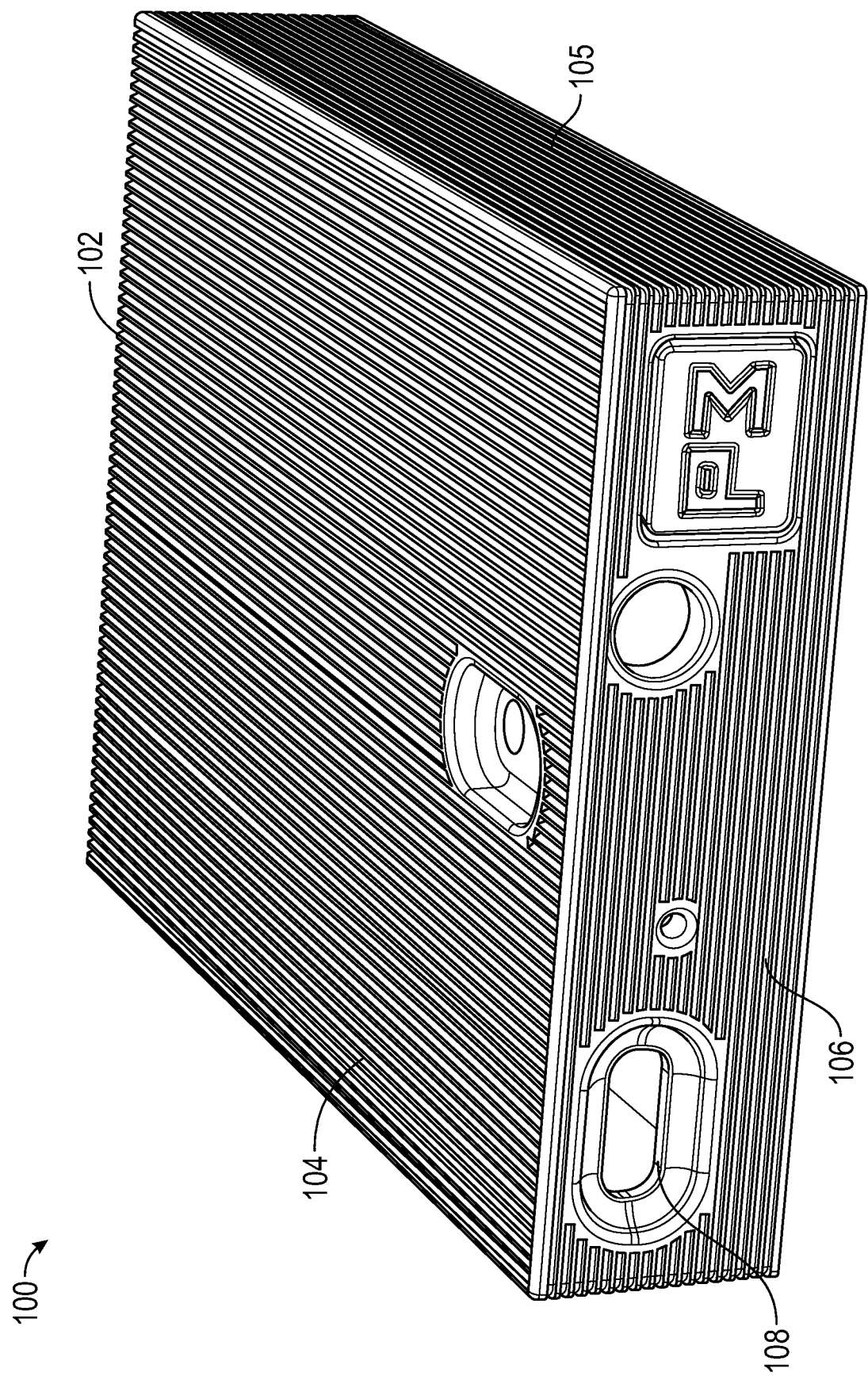
FIG. 1 shows a front perspective view of one embodiment of the scale apparatus.
Figure 2:
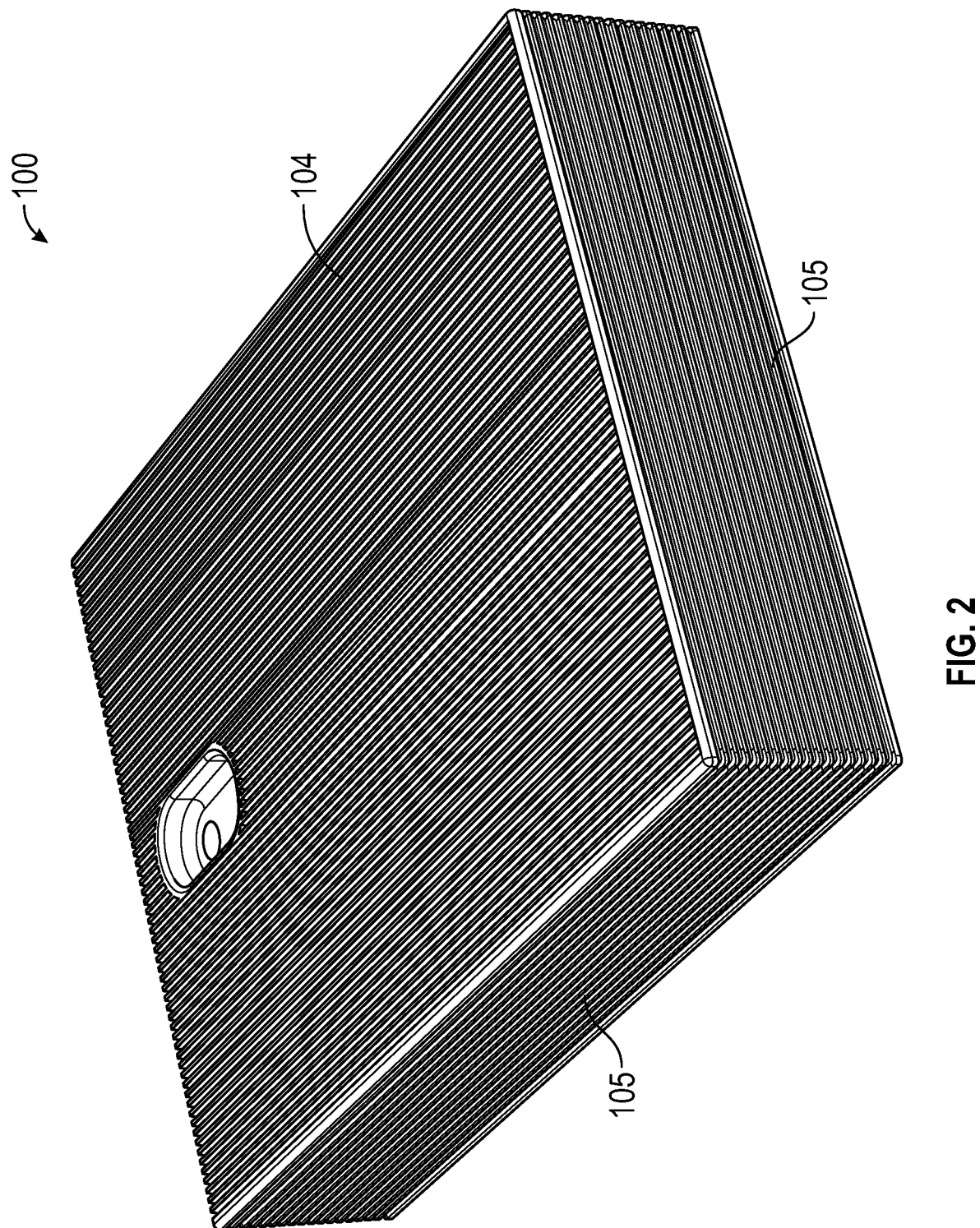
FIG. 2 shows a back perspective view of one embodiment of the scale apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout the above disclosure will now be presented. As used herein, "about" refers to numeric values, including whole numbers, fractions, percentages, etc., whether or not explicitly indicated. The term "about" generally refers to a range of numerical values, for instance, ±0.5-1%, ±1-5% or ±5-10% of the recited value, that one would consider equivalent to the recited value, for example, having the same function or result.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, "substantially cylindrical" means that the object resembles a cylinder but can have one or more deviations from a true cylinder.

The terms "comprising," "including" and "having" are used interchangeably in this disclosure. The terms "comprising," "including" and "having" mean to include, but not necessarily be limited to the things so described.

Provided herein is a scale apparatus for use in magic tricks. When performing magic tricks in close proximity to observers, it is often desired to be able to know a particular item that the observer has selected. For example, an observer may lift up a portion of a deck of cards to identify the card at the bottom of the portion. The magician may then wish to know what that card is with a high level of predictability and accuracy. The scale apparatus described herein is configured to identify a change in weight to determine the identity, number, or other characteristic of one or more removed objects from a plurality of objects initially placed on the scale apparatus. It is also important that any device used in a magic trick is sufficiently concealed from the observer. This often complicates the types of apparatuses that may be used to assist magicians. Therefore, it was surprising that a scale apparatus could be designed to be small enough to fit in, and thus be concealed by, a box such as a playing card tuck box. It was additionally surprising that a scale apparatus inside a box could measure weights accurately to be useful in magic tricks.

Referring to FIGS. 1-4, the scale apparatus 100 may include a housing 102 sized to fit within a box, a pressure plate operable to measure a weight of a plurality of objects, a wireless transmitter, and a microcontroller in communication with the pressure plate and the wireless transmitter.

The wireless transmitter may be operable to transmit measurements or other information from the scale apparatus to another device, such as a mobile device. In an embodiment, the wireless transmitter is a protected Bluetooth® transmitter. The protected transmitter may prevent observers or other members of the public from discovering or connecting to the scale apparatus.

The housing 102 includes a top panel 104, a bottom panel 107, and four side panels 105. A first side panel 106 may include a port 108 configured to receive a charging cable to charge a battery in the scale apparatus. For example, the port 108 may be a USB-C port, a mini-USB port, or a USB port. The first side panel 106 may also include a magnet in some embodiments. The first side panel 106 may further include one or more indicator lights and/or buttons for operation/power.

Figure 3:
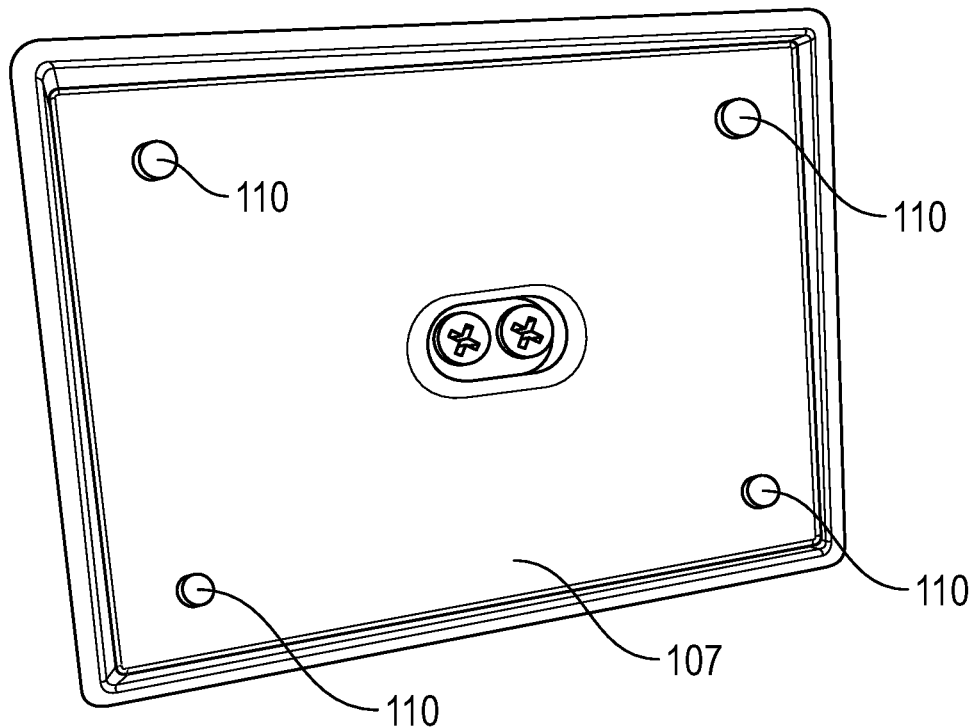
FIG. 3 shows a bottom view of one embodiment of the scale apparatus.
Figure 4:
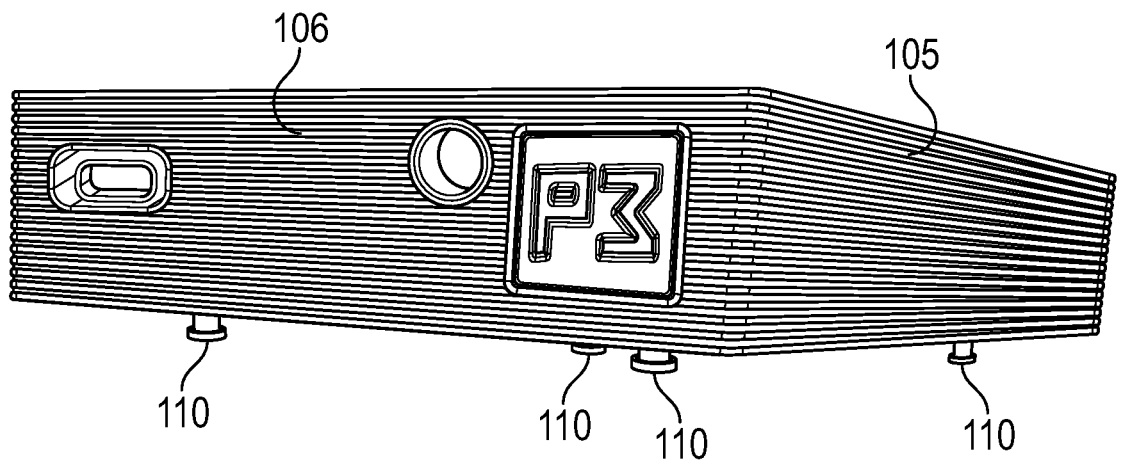
FIG. 4 shows a side view of one embodiment of the scale apparatus.

Referring to FIGS. 3 and 4, the housing 102 may further include at least two legs 110 or at least four legs 110 extending from the bottom panel 107 of the housing 102. In at least one example, the housing 102 includes four legs 110. Each leg 110 extends from the bottom panel 107 of the housing 102. The legs stabilize the scale apparatus to ensure that the pressure plate is able to secure an accurate reading. The legs may have a height of 1 mm to 1.5 mm.

Figure 6:
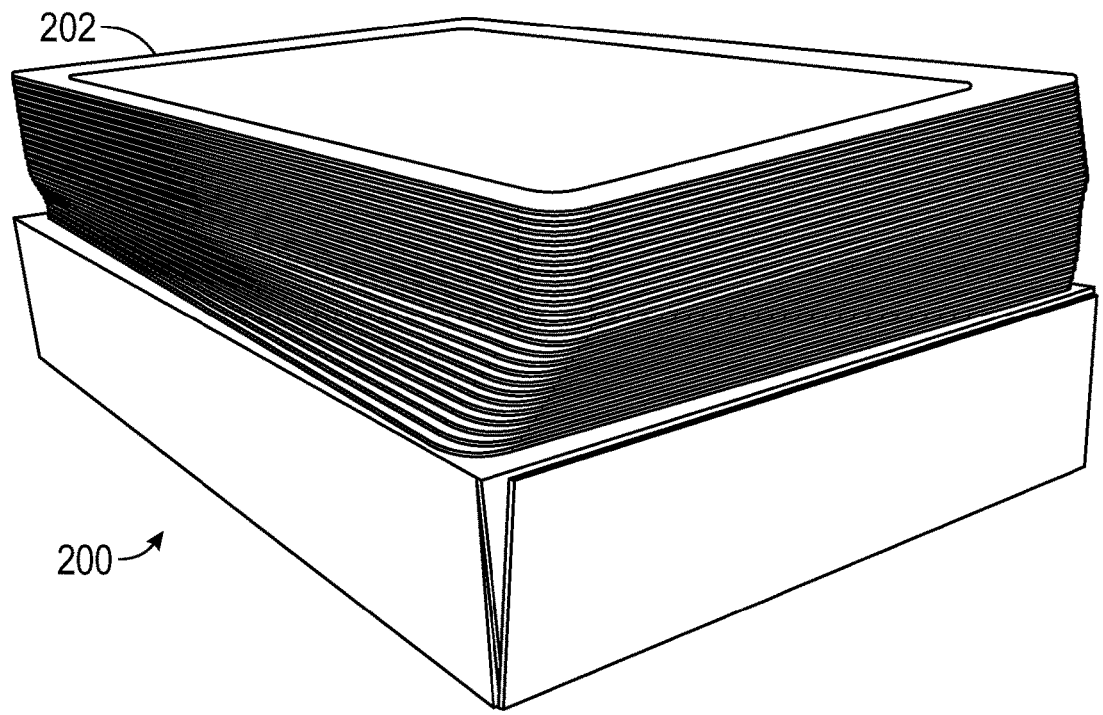
FIG. 6 shows one embodiment of a portion of the scale system with a plurality of objects.

The housing 102 may be sized to fit inside a box to conceal the presence of the scale apparatus to an observer. Non-limiting examples of the box include a playing card tuck box, a cigar box, a cigarette carton, or a shoe box. For example, FIG. 6 shows the scale apparatus inside a playing card box 200. In various non-limiting examples, the box may have dimensions less than about 14 in×14 in×6 in, less than about 10 in×10 in×3 in, or less than about 6 in×6 in×1 in. In one example, the box may have dimensions of about 3.5 in×2.5 in×0.7 in. The housing may have corresponding dimensions such that the housing may have dimensions less than about 14 in×14 in×6 in, less than about 10 in×10 in×3 in, less than about 6 in×6 in×1 in, less than about 5 in×5 in×1 in, less than about 4 in×4 in×1 in, less than about 3.5 in×3.5 in×1 in, less than about 3 in×2.5 in×1 in, or less than about 3 in×2.5 in×0.5 in. In one example, the housing may have dimensions of about 3.5 in×2.5 in×0.7 in.

In an embodiment, the pressure plate may be located inside the housing and adjacent the top panel of the housing. In another embodiment, the pressure plate is located inside the housing and adjacent the bottom panel of the housing. For example, the pressure plate may be located inside the housing and below the wireless transmitter and microcontroller. Therefore, the pressure plate is on the bottom of the scale apparatus and the top of the scale apparatus not only contains all of the electrical components, but it also covers completely the pressure plate at the bottom of the scale apparatus.

The microcontroller may be configured to continuously measure the weight on the pressure plate. The continuous measurement allows for the weight to be measured without any direct input from the user. When the weight holds steady for a sequence of measurements, the microcontroller may transmit a first weight measurement via the wireless transmitter. The weight holding steady indicates that a plurality of objects have been placed on the scale apparatus and the number of objects has not changed for the sequence of measurements over a period of time. In some examples, the weight on the pressure plate may be measured every 0.5 seconds, every 1 second, every 2 seconds, every 3 seconds, every 5 seconds, every 5 seconds, every 10 seconds, or any interval input by the user. In some embodiments, the weight is held steady if the sequence of measurements of the weight is the same for 2, 3, 4, 5, 6, 7, or more sequential measurements.

The microcontroller may further be configured to measure a change in the weight. For example, a change in weight may occur with an observer removes one or more objects from the scale apparatus. When the change in the weight is steady, the microcontroller may transmit a second weight measurement via the wireless transmitter. The change may be measured as a difference from the steady first weight measured. The scale apparatus continues to continuously measure the weight on the scale such that the change may be measured at an interval after the first weight is transmitted. To ensure that the change in weight is intentional, the second weight measurement is not transmitted until the new, changed weight is held steady for a second sequence of measurements. In some embodiments, the second weight is held steady if the second sequence of measurements of the weight is the same for 2, 3, 4, 5, 6, 7, or more sequential measurements. In some embodiments, the scale apparatus is operable to tare prior to the first weight measurement, prior to the second weight measurement, or a combination thereof.

Figure 7:
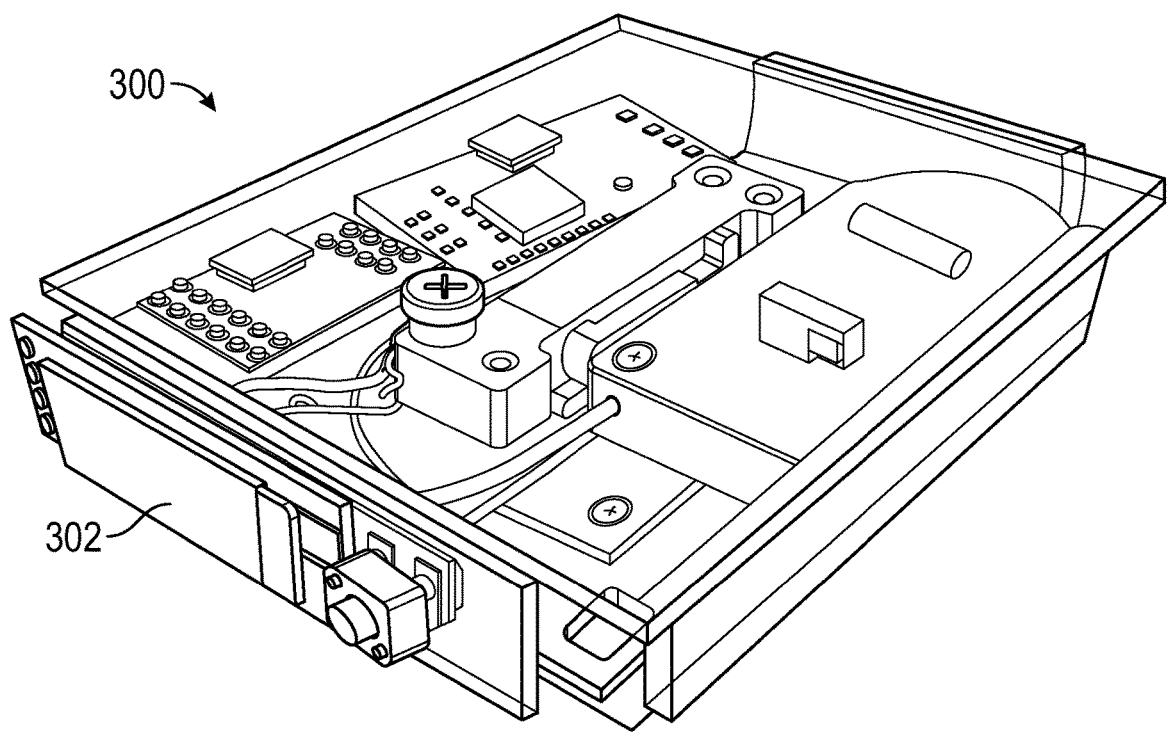
FIG. 7 shows an internal view of one embodiment of the scale apparatus.
Figure 8:
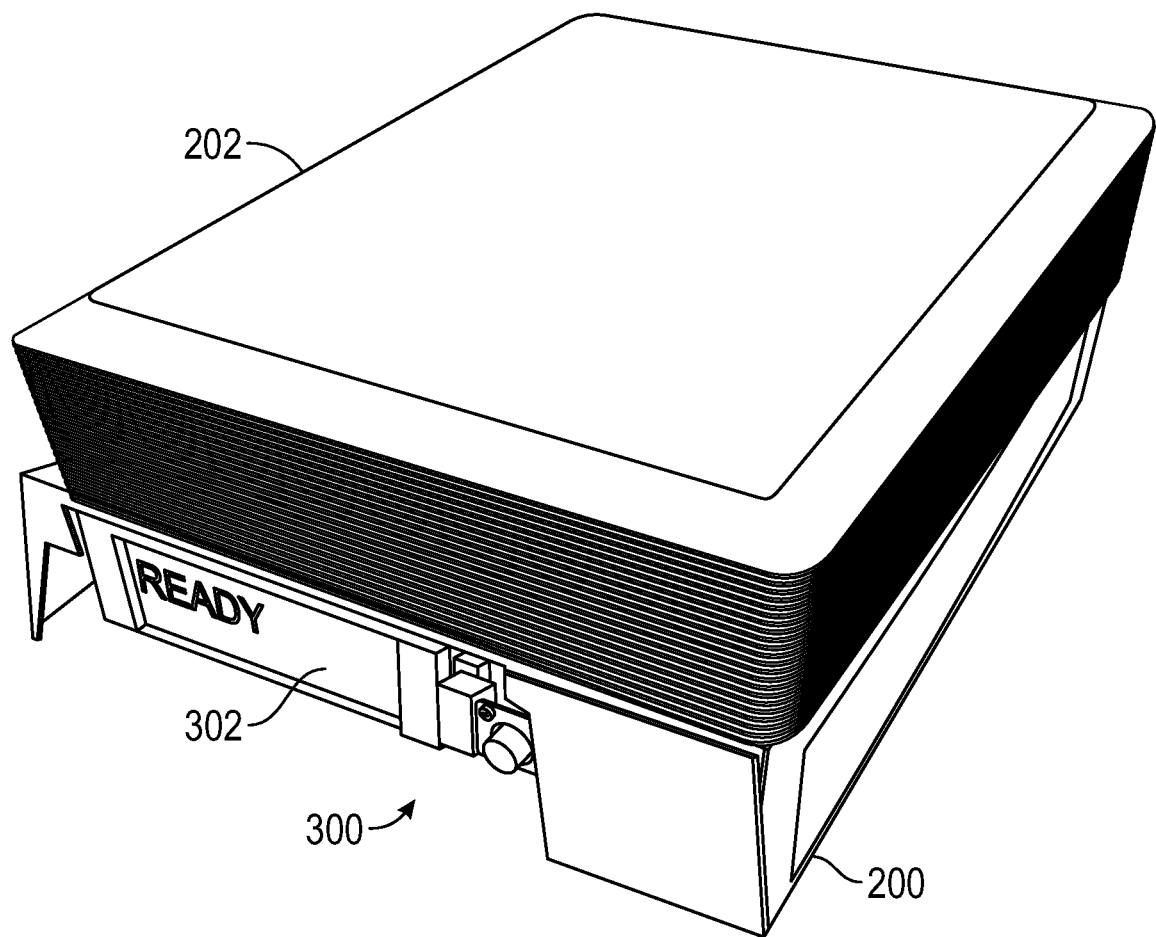
FIG. 8 shows one embodiment of a portion of the scale system with a plurality of objects.

In some embodiments, the scale apparatus may be operable to connect to a mobile device. In other embodiments, the scale apparatus 300 may further include a screen 302, as send in FIGS. 7 and 8. In this embodiment, information may be displayed to the user but remain hidden to the observer. For example, the information may include but is not limited to a first weight, a second weight, the identity of a card picked by an observer, a number of objects removed, or other information useful for performing a magic trick.

The plurality of objects may be a deck of cards, coins, keys, or other handheld objects. To facilitate the identification, the user may input they type of objects, the number of objects to initially be placed on the scale apparatus, a specific order of cards (e.g. standard or custom preordered cards), individual weight of objects.

In an example, a deck of cards may be placed on top of the scale apparatus. After a period of time, an observer may be instructed to remove some cards from the top of the deck and identify the card at the bottom of the removed card. The scale apparatus may be configured to determine the card identified by the observer based on the change in weight.

Further provided herein is a scale system that includes the scale apparatus and a control system. The control system may comprise a processor. In some embodiments, the processor may be configured to receive the first weight measurement and receive the second weight measurement from the scale apparatus. Receiving the weight measurements may allow the control system to perform calculations and/or analysis on the received measurements. In an example, the control system may be configured to receive an input of an initial total number of objects, calculate a weight per object based on the first weight measurement, and estimate the number of objects removed from the scale apparatus based on the second weight measurement and the calculated weight per object. This allows for a user to quickly identify the number of objects that have been removed from the scale apparatus. After the initial input of the number of objects, the scale apparatus and control system may perform each subsequent step automatically without interaction from the user. This allows for an observer to be unaware of the scale apparatus or any functions by the scale apparatus and control system.

In an embodiment, the control system may be further configured to compare the number of objects removed with a library comprising the identity and order of the plurality of objects and estimate the identity of at least one of the removed objects. For example, the library of the identity and order of the plurality of objects may include the objects are playing cards and the order is one of specific card deck orders used by magicians. The control system may include a memory storing the library. The user may add personalized card orders to the library. The library may be referenced to identify one or more of the objects removed. For example, if an observer removes some playing cards from a deck of playing cards on top of the scale apparatus, the control system is configured to determine the number of cards removed based on the change in weight and then determine the card at the bottom on the removed cards by referencing the card order from the library. Thus, allowing the user to "know" the card selected by the observer.

The control system may be further configured to display a representation of the identity of the at least one removed object, the number of objects removed, or other information based on the number of objects removed. The display may be located on a mobile device or on the housing of the scale apparatus, as seen for example in FIGS. 7 and 8. When the display is on the housing of the scale apparatus, it may be discrete and otherwise located on a side panel of the housing. When the display is on a mobile device, the control system may further be configured to adjust the brightness or viewing angle of the display to aid in concealing the information being displayed from the observer while remaining discretely viewable by the user.

In some embodiments, the control system is located on a mobile device such that the scale apparatus is paired to the mobile device for operation. In other embodiments, the control system is located in the housing of the scale apparatus such that the scale apparatus is functional without connection to a mobile device. However, in this embodiment, the scale apparatus may still be operable to connect to a mobile device for updates, inputs, updates to the library, etc.

Figure 5:
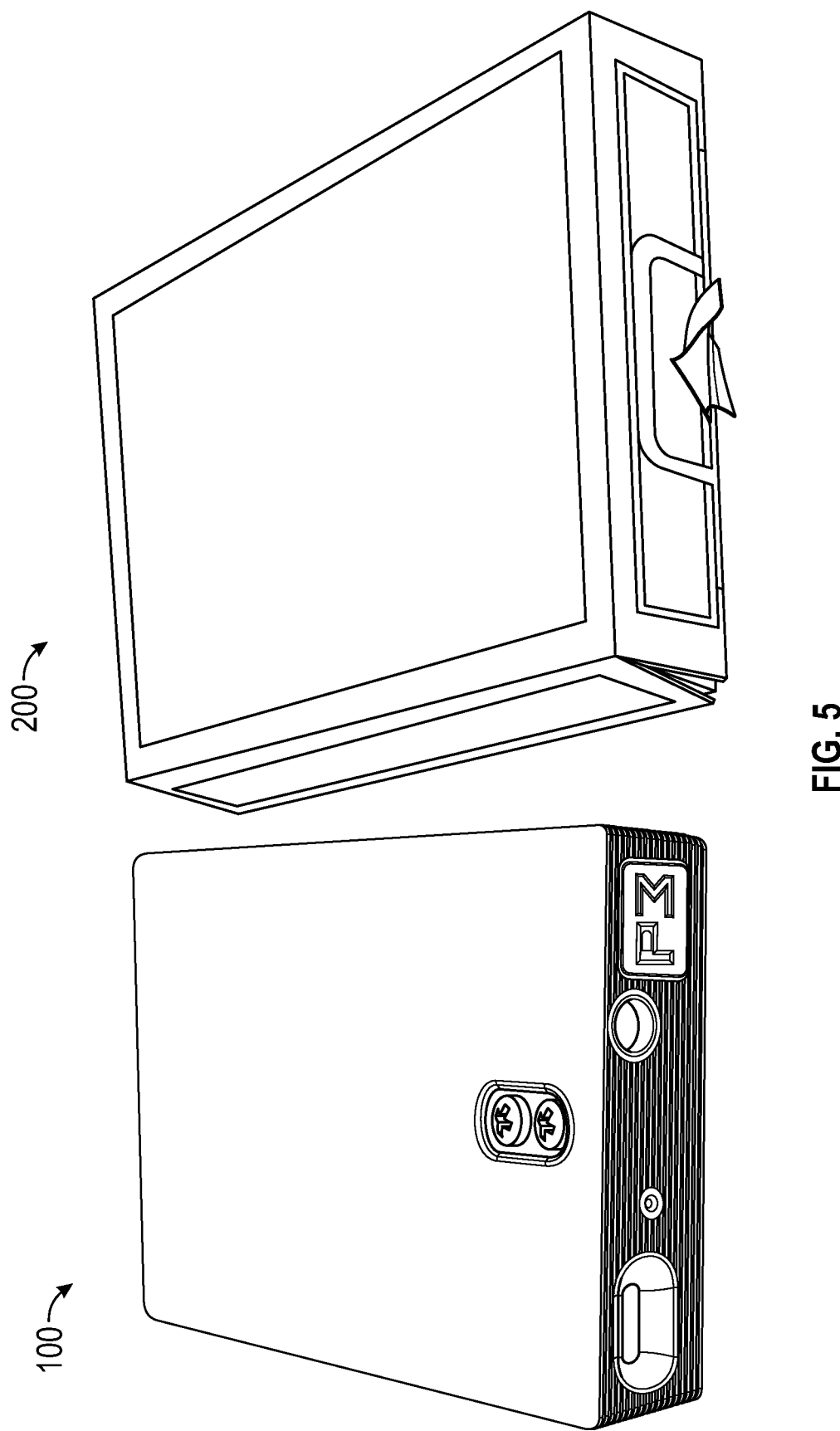
FIG. 5 shows one embodiment of a portion of the scale system.

In an embodiment, as seen in FIGS. 5 and 6, the scale system may further include a modified box 200 operable to conceal the scale apparatus 100. Non-limiting examples of modified boxes include a modified playing card tuck box, a modified cigar box, a modified cigarette carton, or a modified shoe box. The modified box may include a top surface configured to be on top of the pressure plate, four side surfaces, and an opening opposite the top surface.

The legs from the housing may be operable to extend through the opening of the modified box. This allows for the housing of the scale apparatus to be hidden from an observer while maintaining stability and accuracy of the scale apparatus by allowing the legs to contact the surface the scale apparatus is resting on. The legs of the scale apparatus are short enough to still be hidden by the modified box or otherwise be undetectable by an observer. For example, the legs of the housing and the bottom panel of the housing are not viewable to an observer when the legs of the housing are resting on a flat surface.

In some embodiments, the top surface comprises a removeable adhesive to connect the modified box to the housing of the scale apparatus. This allows the modified box to not slip or move from an intended alignment with the scale apparatus to ensure the scale apparatus remains hidden and that the measurements of the scale apparatus are not affected by any unintentional movements.

One of the four side surfaces of the modified box may be a flap to allow access to a first side panel of the housing. The flap may further include a magnet operable to attach to a corresponding side panel (e.g. the first side panel) of the housing of the scale apparatus. The corresponding side panel of the housing may include a magnet and a USB charging port. The magnets may allow for the flap to be opened to access features, such as the USB charging port, on the side panel of the housing and then closed to conceal the side panel of the housing when the scale apparatus is in use.

In some embodiments, the bottom panel of the housing may include an image of the bottom of a playing card tuck box and may be viewable via the opening in the modified playing card tuck box when the legs of the housing are not resting on a flat surface. This allows the illusion of the modified box being a complete box to a casual observer. The image may be attached to the bottom panel with an adhesive or may be directly printed on the bottom panel.

Further provided herein is a method of measuring a weight of a plurality of objects using the scale apparatus and/or scale system. In an embodiment, the method may include continuously measuring a weight of the plurality of objects on the scale apparatus using a pressure plate and microcontroller in the scale apparatus, transmitting a first weight measurement via a wireless transmitter in the scale apparatus when the weight holds steady for a sequence of measurements, measuring a change in the weight using the pressure plate, and transmitting a second weight measurement via the wireless transmitter in the scale apparatus when the change in the weight is steady for a sequence of measurements. In some embodiments, the pressure plate is located inside a housing of the scale apparatus and adjacent a bottom panel of the housing.

The method may further include receiving the first weight measurement, receiving the second weight measurement, receiving an input of an initial total number of objects, calculating a weight per object based on the first weight measurement, and estimating the number of objects removed from the scale apparatus based on the second weight measurement and the calculated weight per object. The objects may be cards, coins, or other handheld objects as described herein. In some embodiments the method may further include displaying the number of objects removed. In additional embodiments, the method may further include comparing the number of objects removed with a library comprising the identity and order of the plurality of objects, estimating the identity of at least one of the removed objects, and/or displaying a representation of the identity of the at least one removed object, the number of objects removed, or other information based on the number of objects removed. The control system may be configured to perform one or more of the steps of the method.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A scale apparatus for performing magic tricks comprising:
   a housing sized to be concealed within a playing card tuck box;
   a pressure plate operable to measure a weight of a plurality of objects;
   a wireless transmitter; and
   a microcontroller in communication with the pressure plate and the wireless transmitter, the microcontroller configured to:
     continuously measure the weight on the pressure plate;
     when the weight holds steady for a sequence of measurements, transmit a first weight measurement via the wireless transmitter;
     measure a change in the weight; and
     when the change in the weight is steady, transmit a second weight measurement via the wireless transmitter.

2. The scale apparatus of claim 1, wherein the scale apparatus is operable to tare prior to the first weight measurement, prior to the second weight measurement, or a combination thereof.

3. The scale apparatus of claim 1, wherein the plurality of objects is a deck of cards, coins, keys, or other handheld objects.

4. The scale apparatus of claim 1, wherein the wireless transmitter is a protected Bluetooth transmitter.

5. The scale apparatus of claim 1, wherein the scale apparatus further comprises a screen.

6. The scale apparatus of claim 1, wherein the housing comprises at least two legs extending from a bottom panel of the housing.

7. The scale apparatus of claim 6, wherein the legs have a height of 1 mm to 1.5 mm.

8. The scale apparatus of claim 1, wherein the housing comprises four legs extending from a bottom panel of the housing.

9. The scale apparatus of claim 1, wherein the pressure plate is located inside the housing and adjacent a bottom panel of the housing.

10. The scale apparatus of claim 1, wherein the pressure plate is located inside the housing and below the wireless transmitter and microcontroller.

11. A scale system comprising the scale apparatus of claim 1 and a control system, the control system comprising a processor configured to:
receive the first weight measurement; and
receive the second weight measurement.

12. The scale system of claim 11, wherein the control system is further configured to:
receive an input of an initial total number of objects;
calculate a weight per object based on the first weight measurement; and
estimate the number of objects removed from the scale apparatus based on the second weight measurement and the calculated weight per object.

13. The scale system of claim 12, wherein the control system is further configured to:
compare the number of objects removed with a library comprising the identity and order of the plurality of objects; and
estimate the identity of at least one of the removed objects.

14. The scale system of claim 13, wherein the control system is further configured to:
display a representation of the identity of the at least one removed object, the number of objects removed, or other information based on the number of objects removed.

15. The scale system of claim 11, wherein the control system is located on a mobile device.

16. The scale system of claim 11, wherein the control system is located in the housing of the scale apparatus.

17. The scale system of claim 11, further comprising a modified playing card tuck box comprising:
a top surface configured to be on top of the pressure plate;
four side surfaces; and
an opening opposite the top surface, wherein the housing comprises legs that extend through the opening.

18. The scale system of claim 17, wherein the top surface comprises a removeable adhesive to connect the modified playing card tuck box to the housing of the scale apparatus.

19. The scale system of claim 17, wherein one of the four side surfaces is a flap and comprises a magnet operable to attach to a corresponding side panel of the housing of the scale apparatus.

20. The scale system of claim 19, wherein the corresponding side panel of the housing comprises a magnet and a USB charging input.

21. The scale system of claim 17, wherein a bottom panel of the housing comprises an image of the bottom of a playing card tuck box and is viewable via the opening in the modified playing card tuck box when the legs of the housing are not resting on a flat surface.

22. The scale system of claim 17, wherein the legs of the housing and a bottom panel of the housing are not viewable to an observer when the legs of the housing are resting on a flat surface.

23. A scale apparatus for performing magic tricks comprising:
a housing sized to be concealed within a box;
a pressure plate operable to measure a weight of a plurality of objects;
a wireless transmitter; and
a microcontroller in communication with the pressure plate and the wireless transmitter, the microcontroller configured to:
continuously measure the weight on the pressure plate;
when the weight holds steady for a sequence of measurements, transmit a first weight measurement via the wireless transmitter;
measure a change in the weight; and
when the change in the weight is steady, transmit a second weight measurement via the wireless transmitter.

24. The scale apparatus or claim 23, wherein the box is a playing card tuck box, a cigar box, a cigarette carton, or a shoe box.

25. A method of performing magic tricks using a scale apparatus sized to be concealed by a playing card tuck box, the method comprising:
continuously measuring a weight of a plurality of objects on the scale apparatus using a pressure plate and microcontroller in the scale apparatus;
transmitting a first weight measurement via a wireless transmitter in the scale apparatus when the weight holds steady for a sequence of measurements;
measuring a change in the weight using the pressure plate; and
transmitting a second weight measurement via the wireless transmitter in the scale apparatus when the change in the weight is steady for a sequence of measurements,
wherein the pressure plate is located inside a housing of the scale apparatus and adjacent a bottom panel of the housing.

26. The method of claim 25, further comprising:
receiving, via a control system, the first weight measurement; and
receiving, via the control system, the second weight measurement.

27. The method of claim 26, further comprising:
receiving, via the control system, an input of an initial total number of objects;
calculating, via the control system, a weight per object based on the first weight measurement; and
estimating, via the control system, the number of objects removed from the scale apparatus based on the second weight measurement and the calculated weight per object.

28. The method of claim 27, further comprising:
comparing, via the control system, the number of objects removed with a library comprising the identity and order of the plurality of objects; and
estimating, via the control system, the identity of at least one of the removed objects.

29. The method of claim 28, further comprising:
displaying a representation of the identity of the at least one removed object, the number of objects removed, or other information based on the number of objects removed.

* * * * *